March 18, 1924.  
E. G. THOMAS  
AUTOMATIC COMPUTING SCALE  
Filed Oct. 7, 1918  
1,486,995  
2 Sheets-Sheet 2
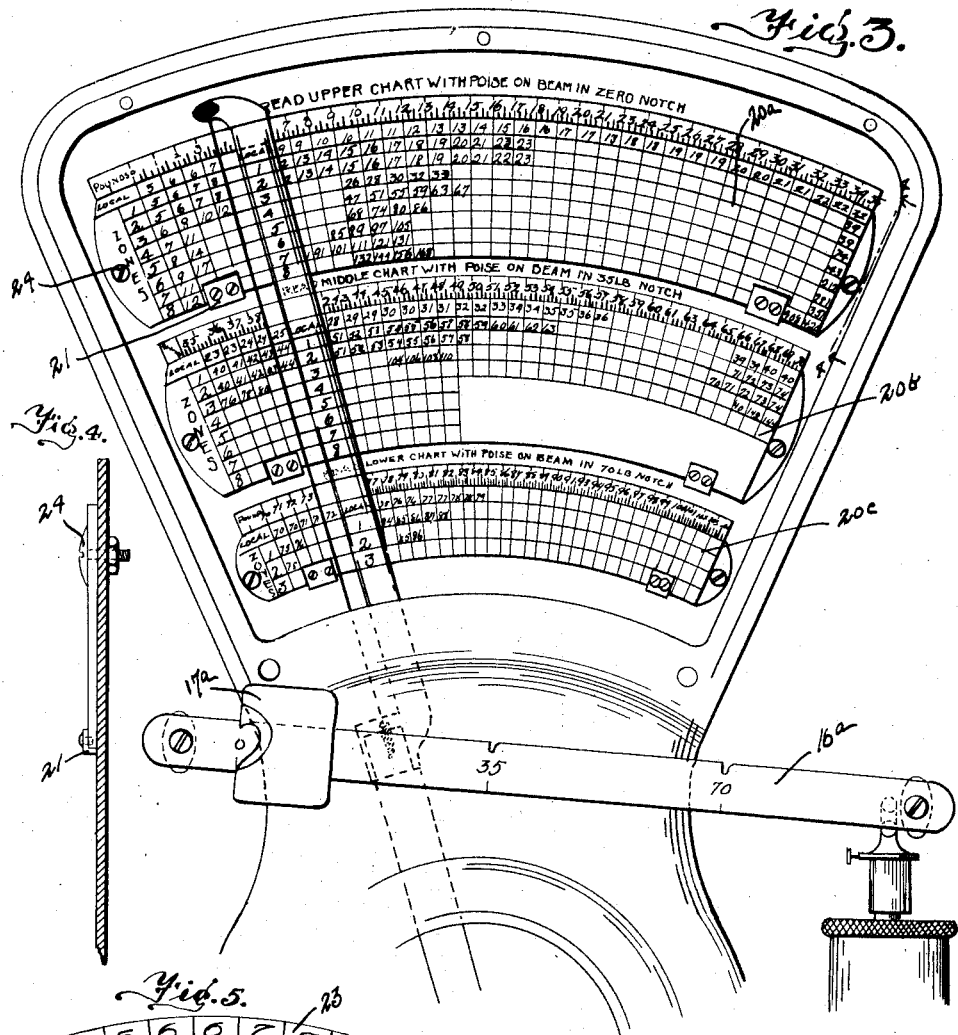

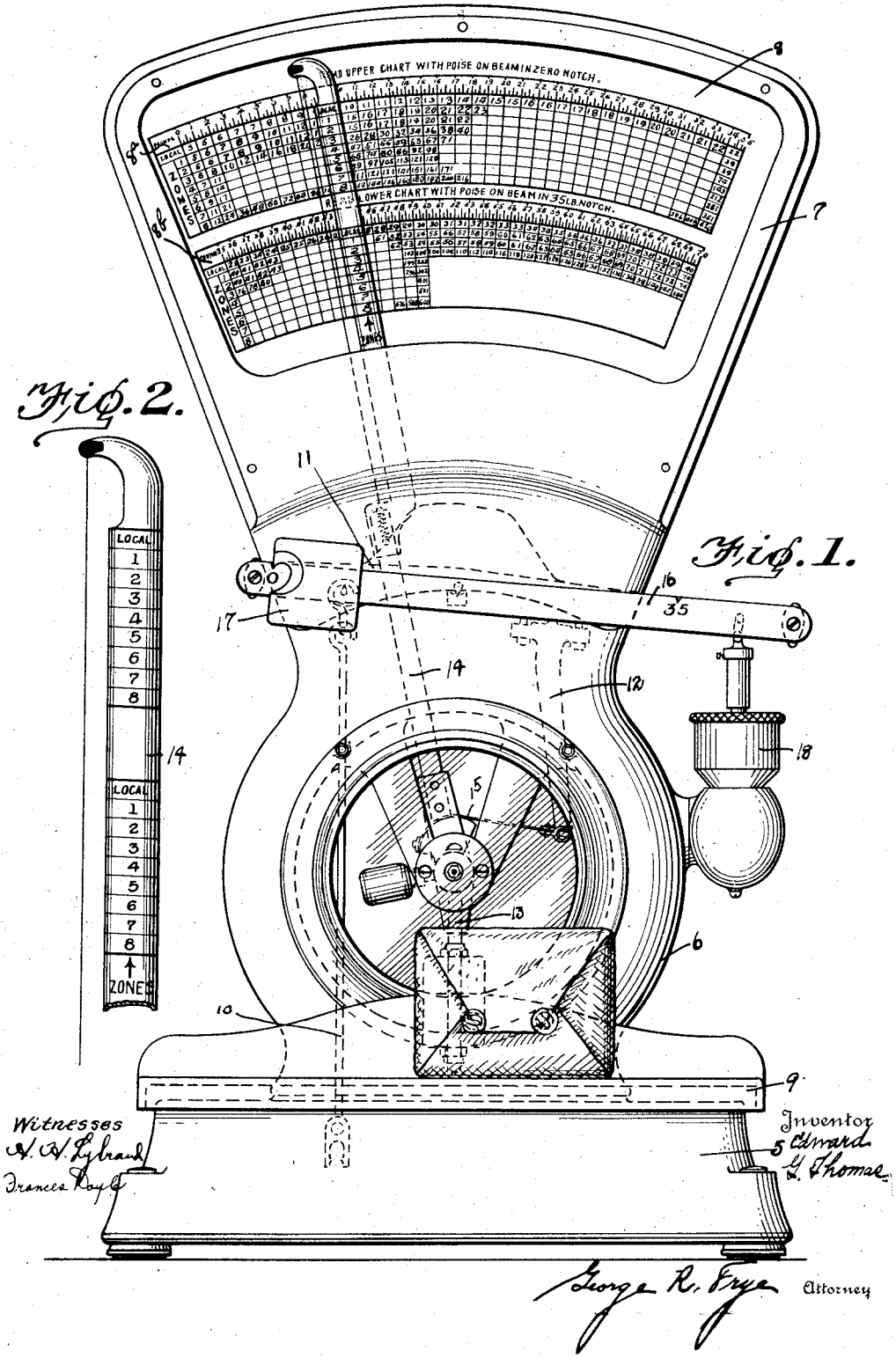

Patented Mar. 18, 1924.

1,486,995

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

AUTOMATIC COMPUTING SCALE.

Application filed October 7, 1918. Serial No. 257,091.

*To all whom it may concern:*

Be it known that I, EDWARD G. THOMAS, a citizen of the United States, residing at Toledo, in the county of Lucas and State of Ohio, have invented certain new and useful Improvements in Automatic Computing Scales, of which the following is a specification.

This invention relates to improvements in automatic computing scales, and more particularly to scales having a plurality of weight and value indications on the dial co-acting with a single indicating hand.

Automatic scales with two rows of weight indications have long been known to the trade, and are shown in several prior patents, as, for example, the patent to De Vilbiss Reissue 12,029, reissued September 9, 1902, but the duplication is limited to the weight indications, no constructions having been hitherto devised for the arrangement of two or more separate computing charts on the same dial to co-act with a single indicating hand. The principal object of my invention is to provide a scale equipped with a plurality of separate computing charts on the same dial and co-acting with the same indicating hand.

A further object of my invention is to provide a plurality of charts usable one at a time according to the position of a poise or movable weight connected with the mechanism moving the indicator hand.

Another object of my invention is to provide a plurality of computing charts arranged for quick attachment to and detachment from the dial whenever desired.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:

Figure 1 is a front elevation of a scale constructed in accordance with my invention;

Figure 2 is an enlarged detail view of the indicating hand used with the scale shown in Figure 1;

Figure 3 is an enlarged front elevation of the upper portion of a scale equipped with another embodiment of my invention;

Figure 4 is an enlarged detail section taken substantially on the line 4—4 of Figure 3; and Figure 5 is an enlarged detail view of a portion of the detachable computing chart.

In the particular scale herein chosen to exemplify my invention, a hollow base 5 supports at one end a housing 6 upon which is mounted a fan shaped casing 7 in which is mounted the indicating chart 8. The hollow base 5 is adapted to contain a leverage system (not shown) upon which is supported a commodity-receiving platform 9, as is common in scales of this character, and the leverage mechanism is connected by a link 10 with a substantially horizontally-disposed scale beam 11 mounted in the housing 6 intermediate the base and the chart casing, the beam 11 being suitably connected, as through a depending arm 12, with a pendulum counterbalance 13 carrying the indicator hand 14, the ribbon 15 being preferably connected at its opposite ends to the pendulum counterbalance and the depending arm respectively. The scale beam 11 carries a tare or capacity beam 16 notched at intervals and equipped with a sliding poise 17 arranged to seat in any of said notches as desired.

To damp the movement of the weighing mechanism and prevent the transmission of any shocks or jars from the platform to the pendulum counterbalance, a dash pot 18 is employed, being preferably connected, as herein shown, with the scale beam 11.

It will be understood that any suitable platform and platform lever mechanism may be employed in connection with the weighing mechanism of the scale, the weighing mechanism herein shown being designed to satisfactorily operate when employed in various kinds of scales. In using the scales as above described, the commodity whose weight is to be ascertained is placed upon the platform 9 and imparts a downward movement thereto, which movement is transmitted through the platform-supporting leverage system and link 10 to one arm of the scale beam 11, swinging this arm downwardly and the opposite arm, to which the depending arm 12 is secured, upwardly. The upward and outward movement of the depending arm 12 serves to swing the pendulum counterbalance 13 through the ribbon 15 to a position counterbalancing the weight of the load on the scale platform. The indicating hand 14, being fixed to the pendulum counterbalance so as to swing therewith, moves over the chart to indicate thereon the weight of such load.

The indicating dial 8 preferably consists of a plurality of weight and computation indicating charts, with each of which the indicating hand co-acts. In Figure 1 I have illustrated an adaptation of my invention to charts for parcel post use, the computing portion of the charts being arranged to show the postal rates for parcel post packages in the various zones at predetermined weights. Thus, the upper chart 8ª shows an upper row of weight graduations arranged concentrically of the pendulum pivot from which the indicating hand swings, the weights herein chosen ranging from zero to 35 lbs., and a plurality of rows of parcel post rate computations in radial alignment with the weight indications and sub-divided by concentric rows in accordance with the several zones set forth in the postal regulations. The lower chart 8ᵇ is similarly arranged with the exeption that the weight computations range from 35 to 70 lbs. and the computations shown in the computing portion of the chart show postal rates for these weights. The upper chart is used in the operation of the scale as long as the commodity to be weighed does not exceed the chart capacity of 35 lbs., and the poise 17 remains in the zero notch on the beam 16 as long as this upper chart is in use. When, however, the weight of the commodity being weighed exceeds 35 lbs., the lower chart comes into use, the poise 17 is moved to the notch in the beam offsetting 35 lbs., and the commodity is placed on the platform. Should its weight be less than the capacity of the lower chart, it can be readily read upon the lower chart, together with the postal rates for mailing it to various zones. To insure the reading of the correct chart by the operator the following inscription is preferably placed above the upper chart: "Read upper chart with poise on beam in zero capacity"; and the following inscription above the lower chart: "Read lower chart with poise on beam in 35 lb. notch."

To effectively co-operate with the several circumferential rows of the upper and lower charts, the index hand 14 is marked with separate spaced index portions, substantially as shown in Figure 2, those portions of the index hand in alignment with the weight rows being unmarked or bearing a weight mark if desired, that portion in alignment with the first adjacent row being marked "Local" to show that the rate indicated thereby is for a local zone, that in alignment with the next adjacent row being marked "1" to indicate that the rates aligning therewith are for the first zone, that portion in alignment with the next adjacent row being marked "2" to show the second zone, and so on. The plurality of markings on the index hand assures a quick reading of either chart in whatever zone it is desired to send a package being weighed.

In Figures 3–5 I have illustrated another embodiment of my invention showing a further development of the idea. In this embodiment I employ three weight charts 20ª, 20ᵇ and 20ᶜ, radially arranged and concentrically marked with the fulcrum of the pendulum counterbalance as a center. The upper chart and the middle chart are substantially identical with the upper and lower charts shown in Figure 1, while the lower chart ranges from 70 to 105 lbs. and is used for weighing parcels between these weights. To use this lower chart the poise 17ª should be placed in the 70 lb. notch on the beam 16ª. Four or a greater number of charts could as readily be arranged.

The computing charts co-operating with these weight charts are detachably secured to the dial in any desired manner, the computations being aligned with the several weight graduations and secured in their aligned positions. In the embodiment herein illustrated I have provided radially spaced lugs 21 on the dial 20 and notches 22 on the detachable computing charts 23, substantially as shown in Figure 5, these notches fitting over the lugs 21 and serving automatically to align the computing charts. Suitable bolts or screws 24 are then arranged to lock the computing charts in position.

While it will be apparent that the illustrated embodiments of my invention herein illustrated are well calculated to adequately fulfill the objects primarily stated, it is to be understood that the invention is susceptible to variation, modification and change without departing from the spirit and scope of the invention as set forth in the subjoined claims.

Having described my invention, I claim:

1. In a scale, in combination, a plurality of concentrically arranged and stationary weighing and computing charts, each having a plurality of concentric rows of graduations, the graduations in each row on each of the inner charts succeeding the graduations in a corresponding row of the next outer chart.

2. In a scale, a plurality of stationary weighing and computing charts arranged with indications succeeding each other on the several charts, the chart with the lowest weight and value indications being arranged above the remaining chart or charts, and a single index hand co-operating with all of said charts and bearing indications distinguishing the several rows of computations on each of said charts.

3. In a scale, a plurality of radially spaced weighing and computing charts arranged with indications succeeding each other on the several charts, the chart with the lowest weight and value indications being arranged above the remaining chart or charts, and a single index hand co-operating with all of said charts and bearing indications distinguishing the several rows of computations on each of said charts.

4. In a scale, a plurality of stationary weighing and computing charts arranged with indications succeeding each other on the several charts, the chart with the lowest weight and value indications being arranged above the remaining chart or charts, and a single index hand pivoted at the common center of said charts and co-operating with all of said charts and bearing indications distinguishing the several rows of computations on each of said charts.

5. In a scale, in combination, automatic weighing mechanism, a plurality of stationary weighing and computing charts co-operating therewith and arranged with indications succeeding each other on the several charts, the chart with the lowest weight and value indications being arranged above the remaining chart or charts, means connected with said weighing mechanism and movable into co-operative relation with said weight and value indications, and readily detachable means for securing each of said charts in position.

6. In a scale, a plurality of radially-spaced weighing and computing charts arranged with indications succeeding each other on the several charts, the chart with the lowest weight and value indications being arranged above the remaining chart or charts, a single index hand co-operating with all of said charts and bearing indications distinguishing the several rows of computations on each of said charts, and readily detachable means for securing each of said charts in position.

7. A weighing scale having index mechanism comprising a series of concentric charts provided with weight and value graduations affording in succession a continuation of the other, an index hand adapted to traverse the graduations of all of said charts, and scale mechanism operatively connected with the index hand and including a beam mounted for rocking movement adjacent the index mechanism and having a poise adjustable on the beam to vary the movement thereof to conform with the graduations on the several charts.

8. A weighing scale having index mechanism comprising a series of concentric charts provided with weight and value graduations affording in succession a continuation of the other, an index hand adapted to traverse the graduations of all of said charts, and scale mechanism operatively connected with the index hand and including a beam mounted for rocking movement adjacent the index mechanism, a weighted pendulum carrying the index hand and controlling the movement of the beam, and a poise adjustable on the beam to vary the movement thereof to conform with the graduations on the several charts.

9. In a scale, in combination, automatic weighing mechanism, a plurality of radially-spaced weighing and computing charts having indications succeeding each other on the several charts, a single indicating hand connected to said weighing mechanism and co-operating with all of said charts, and means for removably securing each of said charts in position permitting the quick detachment and replacement of any one or more of said charts.

10. In a scale, a plurality of concentric weighing and computing charts having indications succeeding each other on the several charts, a single indicating hand co-operating with all of said charts, and means for removably securing each of said charts in position permitting the quick detachment and replacement of any one or more of said charts, said means comprising lugs fixed on the scale frame in radial alignment, and said charts being provided with slots fitting over said lugs and apertures for the reception of locking elements, and readily removable locking elements for securing the charts to the scale frame.

EDWARD G. THOMAS.

Witnesses:
C. E. WILCOX,
FRANCES DOYLE.